(12) United States Patent
Sugimoto (10) Patent No.: US 6,178,258 B1
(45) Date of Patent: Jan. 23, 2001

(54) PLAY DEVICE FOR GENERATING SYNTHESIZED SELF-PORTRAIT

(75) Inventor: Hideki Sugimoto, Osaka (JP)

(73) Assignee: Funai Electric Co., Ltd., Osaka (JP)

(*) Notice: Under 35 U.S.C. 154(b), the term of this patent shall be extended for 0 days.

(21) Appl. No.: 09/176,946

(22) Filed: Oct. 22, 1998

(30) Foreign Application Priority Data

Oct. 23, 1997 (JP) .................................................. 9-009410

(51) Int. Cl.[7] .............................. G06K 9/00; H04N 7/04; G06F 15/16
(52) U.S. Cl. .............................. 382/154; 386/95; 709/201
(58) Field of Search .............................. 382/154; 386/95; 709/201

(56) References Cited

U.S. PATENT DOCUMENTS

| 5,489,103 | * | 2/1996 | Okamoto | 463/29 |
| 5,532,923 | * | 7/1996 | Sone | 700/9 |
| 5,745,126 | * | 4/1998 | Jain et al. | 348/42 |
| 5,774,129 | * | 6/1998 | Poggio et al. | 345/441 |
| 5,956,459 | * | 9/1999 | Kato et al. | 386/95 |

FOREIGN PATENT DOCUMENTS

| 5-233308 | 9/1993 | (JP) . |
| 3014733 | 6/1995 | (JP) . |
| 8-280934 | 10/1996 | (JP) . |
| 9-149368 | 6/1997 | (JP) . |
| 9-163352 | 6/1997 | (JP) . |

* cited by examiner

*Primary Examiner*—Krisna Lim
(74) *Attorney, Agent, or Firm*—Morgan, Lewis & Bockius LLP (57) ABSTRACT

A play device for generating a synthesized self-portrait having a photographed image of a player and a frame image, the device including a terminal for displaying and printing the synthesized self-portrait, a network server for providing a commercial data to be shown on the terminal while the player waits for printing of the synthesized self-portrait, the commercial data being renewed in the terminal without interfering with generation of the synthesized self-portrait, a management device for managing the play device, and a monitoring system for monitoring various operating conditions of the play device.

11 Claims, 6 Drawing Sheets

PLAY DEVICE FOR GENERATING SYNTHESIZED SELF-PORTRAIT

This application claims the benefit of Japanese utility model patent application No. Hei. 9-9410, filed Oct. 23, 1997, which is hereby incorporated by reference.

BACKGROUND OF THE INVENTION

1. Field of the Invention

The present invention relates to a play device for generating a synthesized self-portrait, and more particularly, to a play device for generating a synthesized self-portrait by synthesizing a a photographed image of a player with a background frame image. Although the present invention is suitable for a wide scope of applications, it is particularly suitable for showing a commercial on a terminal while the player waits for printing the self-portrait in the play device.

2. Discussion of the Related Art

An example of a play device for generating a synthesized self-portrait is disclosed in Japanese Utility Model Registered Publication No. 3014733. Generally, the play device for generating a synthesized self-portrait begins to operate when a coin is put into the device. The first step for generating a synthesized self-portrait is to photograph a desired object with a camera attached in a terminal. An obtained image and a previously prepared background frame image are synthesized, so that a self-portrait is completed and displayed on a display device such as CRT. The self-portrait is printed on a seal by a video printer. This type of function is referred to as a standalone type play.

Further, it has also been proposed that a play device capable of generating a home page including a self-portrait and voice in the Internet. After the home page is then registered in the Internet through the public telephone line, the self-portrait on the home page is printed on a seal. This type of function is referred to as a network type play, and a terminal that performs the network type play is referred to as a network type play device.

After a self-portrait is synthesized in the terminal of the play device and displayed on the information display device, it is printed on the seal. When the self-portrait is printing on the seal for about 30 seconds, the self-portrait on the information display device disappears and a selected image plane appears. Since the player has to wait for completing the printing process, he has nothing to do in this period. Accordingly, there has been a demand to more entertain the player in the conventional play device.

The conventional play device does not display a selected image plane for the waiting period while completing the printing. Instead, a pleasant moving image or a still picture is displayed during each printing process. Alternatively, music or a pleasant voice is played by a sound system.

Although it does not belong to the technical field of the play device for generating a synthesized self-portrait, Japanese Patent Unexamined Publication No. Hei. 8-280934 discloses a system terminal for a common game system connected to a host computer through the public telephone line. Using this system, a game program can be renewed by the latest one.

Also, Japanese Patent Unexamined Publication No. Hei. 5-233308 discloses a POS terminal connected to a host computer through the communication line in the POS system. A program can be thus downloaded from the host computer by a remote control in accordance with a system program provided in the POS terminal whenever a version of the program is upgraded.

However, the above conventional program renewal system of the common game system and the POS system cannot be adopted to the play device for generating a synthesized self-portrait because the play device requires to be operated differently from those systems. For example, in the play device for generating a synthesized self-portrait, a self-portrait is formed at each terminal and is printed on a seal. Each terminal is connected to a server, so that a home page is registered in the Internet. In addition to the aforementioned network type play functions, it is necessary to rewrite one or more commercial data at each terminal in an appropriate time. Thus, when the commercial data is rewritten by the remote control in the play device for generating a synthesized self-portrait, it is necessary to provide a program which operates quite differently from an ordinary operation. When this program is operated, it is impossible to take a photograph or print a seal at the same time.

For example, when the terminal is located in a loud street, the terminal may be continuously used from the morning to the evening as long as the electric power is supplied. Thus, there may be no spare time provided for rewriting the commercial data in the terminal. Further, in many cases, the commercial data can not be rewritten since no electric power is supplied to the terminal in the evening.

SUMMARY OF THE INVENTION

Accordingly, the present invention is directed to a play device for generating a synthesized self-portrait that substantially obviates one or more of the problems due to the limitations and disadvantages of the related art.

An object of the present invention to provide a play device for generating a synthesized self-portrait which entertains a player during the waiting period by playing a commercial as well as effectively using a pleasant image plane.

Another object of the present invention is to provide a play device for generating a synthesized self-portrait which the commercial data can be rewritten through a communication network, so that the commercial is conducted at low cost regardless of the number of terminals.

Still another object of the present invention is to provide a play device for generating a synthesized self-portrait which the commercial data is automatically rewritten without interfering with the function of generating and printing a self-portrait.

A further object of the present invention is to provide a play device for generating a synthesized self-portrait which the commercial data is rewritten at each terminal in accordance with utilization of the commercial data monitored by the management data at each terminal.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, a play device for generating a synthesized self-portrait having a photographed image of a player and a frame image, the device includes a terminal for displaying and printing the synthesized self-portrait, a network server for providing a commercial data to be shown on the terminal while the player waits for printing of the synthesized self-portrait, the commercial data being renewed in the terminal without interfering with generation of the synthesized self-portrait, a management device for managing the play device, and a monitoring system for monitoring various operating conditions of the play device.

In another aspect of the present invention, a terminal of a play device for generating a synthesized self-portrait having a photographed image of a player and a frame image, displaying the synthesized self-portrait on a display device, and printing the synthesized self-portrait on a sheet, the terminal includes a communication network access allowing access to a server storing and providing a commercial data with the terminal, a downloader for downloading the commercial data from the server to an addressed terminal, the commercial data being rewritable in the terminal, and a data storage device accommodating the commercial data, wherein the commercial data is displayed on the display device or a voice is played by a sound system simultaneously when the self-portrait is printed on a sheet.

In a further aspect of the present invention, a server of a play device for generating a synthesized self-portrait, includes a rewriting commercial data setting unit for setting at least one rewriting commercial data when a plurality of terminals of play devices for generating synthesized self-portraits are individually designated, and a download permission unit for permitting each terminal to download the rewriting commercial data when each terminal accesses the download permission unit through a communication network.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
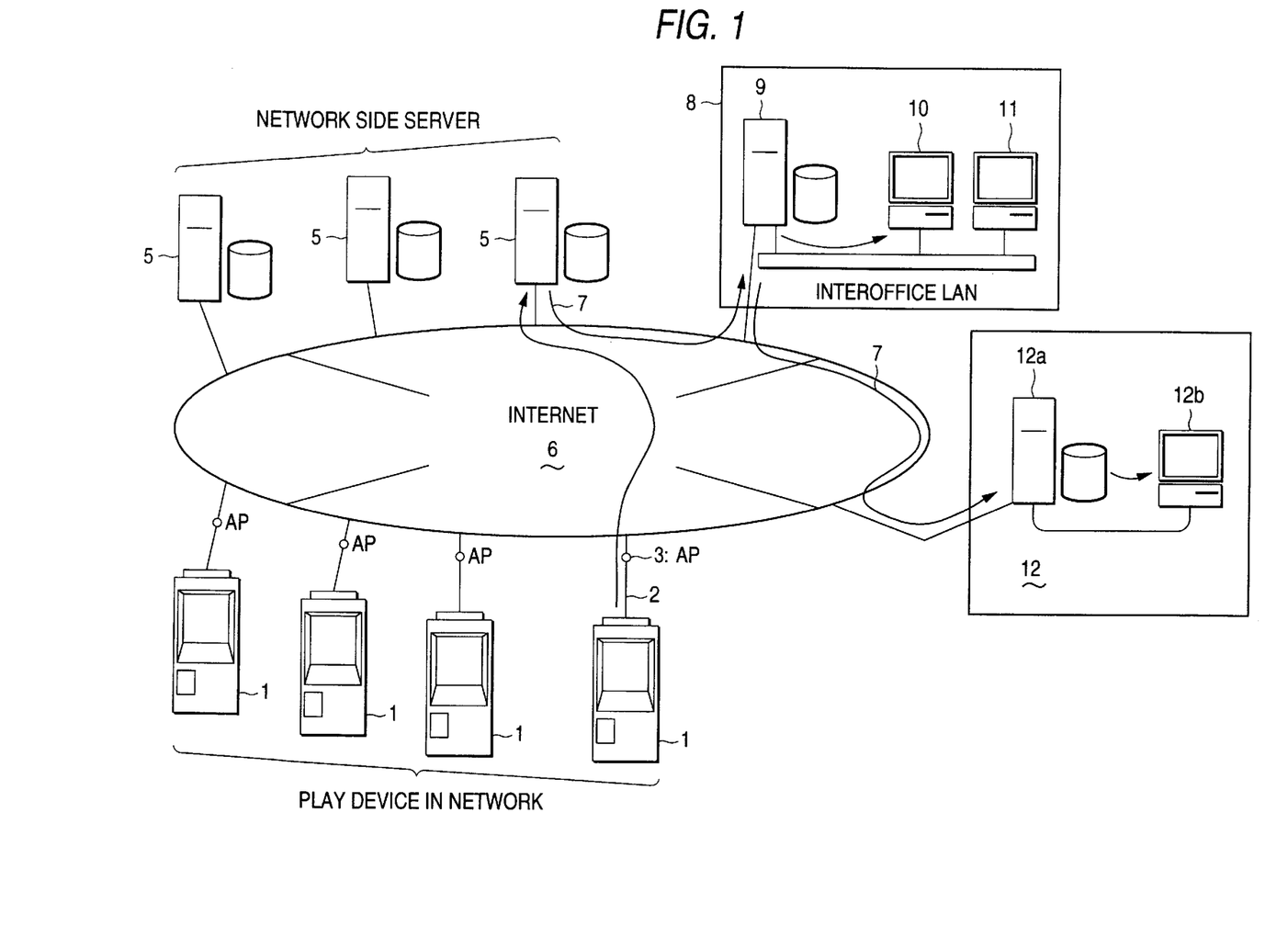
FIG. 1 is a schematic view of the overall system of a play device for generating a synthesized self-portrait of the present invention.

FIG. 1 is a schematic view of the overall system of the play device for generating a synthesized self-portrait of the present invention. A terminal 1 of the play device for generating a synthesized self-portrait begins to operate when a coin is put into the play device. In order to make a synthesized self-portrait in the play device, a desired image has to be first photographed by a player. A frame image designated by the player are then synthesized with the photographed image to form a self-portrait.

A large number of terminals 1 of the play device for generating a synthesized self-portrait is operating throughout the country. Each terminal 1 is connected to the Internet 6 via an access point (AP) by the digital telephone line 2 (for example, ISDN). A network server 5 for opening the home page to the public is also connected to the Internet 6. A management device 8 including a management server 9 and a management computer 10 are connected to the Internet 6 through an exclusive line 7. A business data processing computer 11 is connected to the Internet 6 via the interoffice LAN.

The terminal 1 of the play device for generating a synthesized self-portrait adds self-portrait data, such as image data, voice data, text data, and commercial data, to the management data. The self-portrait data is transmitted to the network server 5 via the digital telephone line 2. The network server 5 separates the management data from the self-portrait data, and transmits a group of management data to the management server 9 and the business data processing computer 11 via the exclusive line 7.

The management computer 10 conducts managements of sales, the frequency of utilization of the terminal, the frequency of utilization of the frame image, and the amount of money stored in the play device. The business data processing computer 11 conducts managements of collection of money and the bill. The management device 8 is connected to a customer monitoring system 12 via another exclusive line 7. The customer monitoring system 12 includes an Internet receiving server 12a and a monitoring computer 12b. The Internet receiving server 12a and the monitoring computer 12b are connected to each other by the interoffice LAN. The customer monitoring system 12 displays information whether all sheets of paper have been used up as well as various operating conditions.

Figure 2:
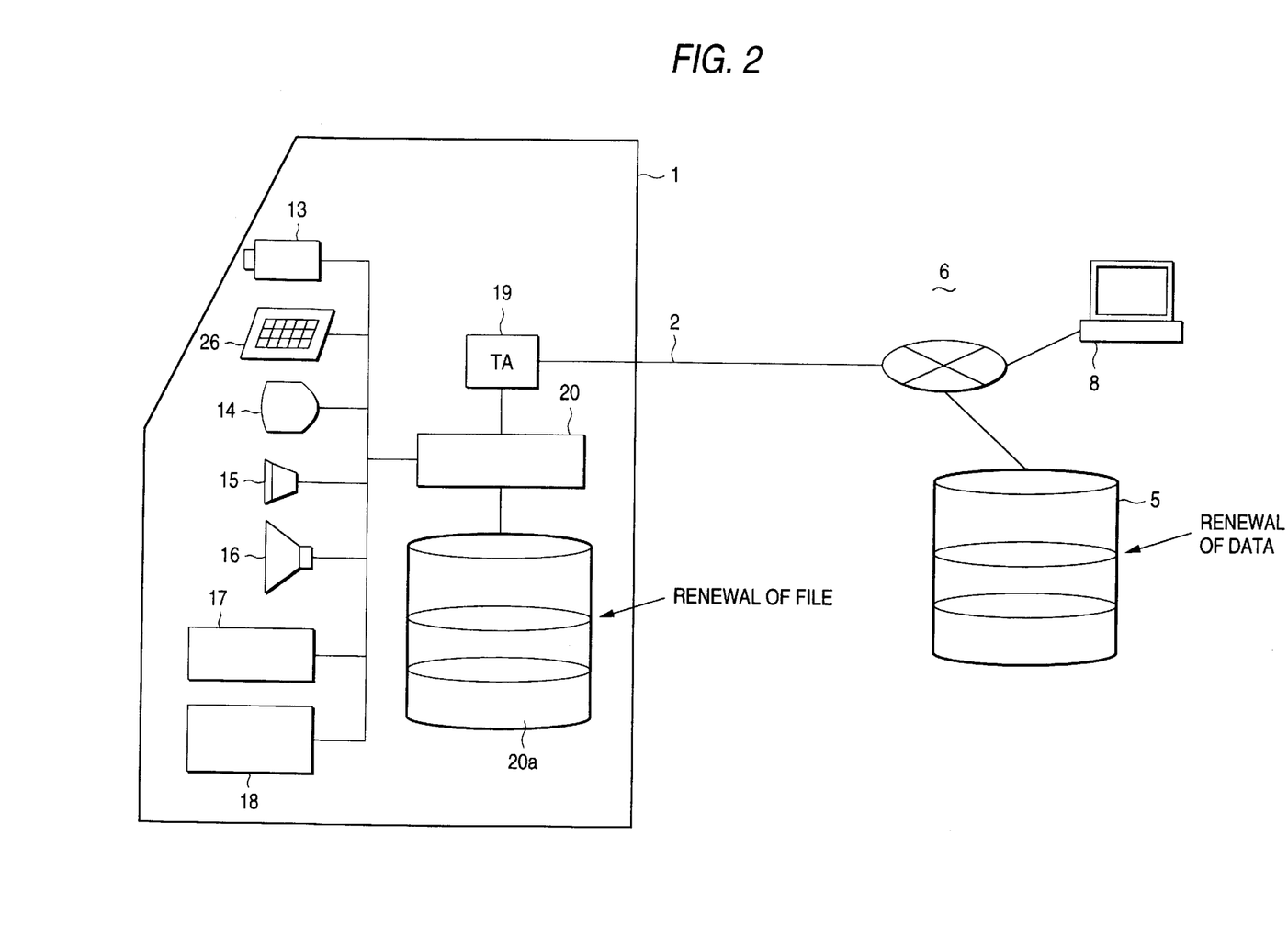
FIG. 2 is a block diagram showing an arrangement of the periphery of a terminal of the play device for generating a synthesized self-portrait of FIG. 1.

FIG. 2 is a block diagram showing the arrangement of the terminal 1 of the play device for generating a synthesized self-portrait in detail. The terminal 1 of the play device for generating a synthesized self-portrait includes a computer 20 for controlling the play function of the play device. The computer 20 includes a data storage 20a, such as a hard disk, which accommodates a control program and a file containing a plurality of types of frame image data to be used as a background image. The data storage 20a also contains commercial data such as commercial images, characters, and voice.

The computer 20 is connected to: a camera 13 for photographing a desired object by a player; a CRT 14 for displaying a synthesized self-portrait including a photographed object, frame image data designated by the player, and character information; a microphone 15 for inputting voices; a speaker 16 for outputting voice; a printer 17 for conducting color-printing of the synthesized self-portrait on a seal; a coin counter 18 for sorting and counting the amount of money in the device; and a key board 26 for inputting character information by the player and for selecting a frame image. Instead of the key board 26, characters may be inputted by a touch panel arranged on the CRT 14. The computer 20 has both the stand-alone type play function and the network type play function. Also, the camera 13, CRT 14, printer 17, and key board 26 may be used for both functions described above.

The self-portrait to be printed on the seal is formed according to the object (generally, the upper half of body of the player) photographed by the camera 13, the frame image data and the character data designated by the player with the key board 26. Further, voice may be inputted to make the self-portrait data with the microphone 15. The self-portrait data and the commercial data used in the period of printing the seal are transmitted to the network server 5 via the terminal adapter (TA) 19, the digital telephone line 2, and the Internet 6.

Next, operation of the network type play device for generating a synthesized self-portrait will be explained as follows. Particularly, a method of rewriting the frame image data and the commercial data of the terminal 1 of the play device for generating a synthesized self-portrait will be explained below.

When the shop is open in the morning, the electric power source of the terminal 1 is turned on by the shop owner. Immediately after the shop is open in the morning, the number of customers is usually small. Therefore, even if another program for rewriting the data is started, it is recognized as "preparation work." Accordingly, during executing the preparation work, various data is transmitted between the server and the terminal 1.

The following data is transmitted in the preparation work period.

(1) New frame image data and commercial data are transmitted from the server to the terminal.
(2) A new program is transmitted from the server to the terminal.
(3) Non-transmitted data in the previous operation for some reasons is transmitted from the terminal to the server.
(4) Information about sales obtained until the electric power source was turned off is transmitted from the terminal to the server.
(5) Information on starting operation is transmitted from the terminal to the server.

A server is referred to as a device having a portion or all of the functions of the server 5 arranged in the network and the management server 9 in this specification.

In order to transmit data, an individual number (ID of the terminal) necessary for communication is allotted to each terminal 1. This individual number is different from the ID of the Internet 6. That is, the individual number represents a place at which the terminal is installed and a function of the terminal, which are necessary for managing the play device. In this system, this individual number is referred to as "terminal ID", which is previously registered in the management server 9 and the management computer 10.

Figure 3:
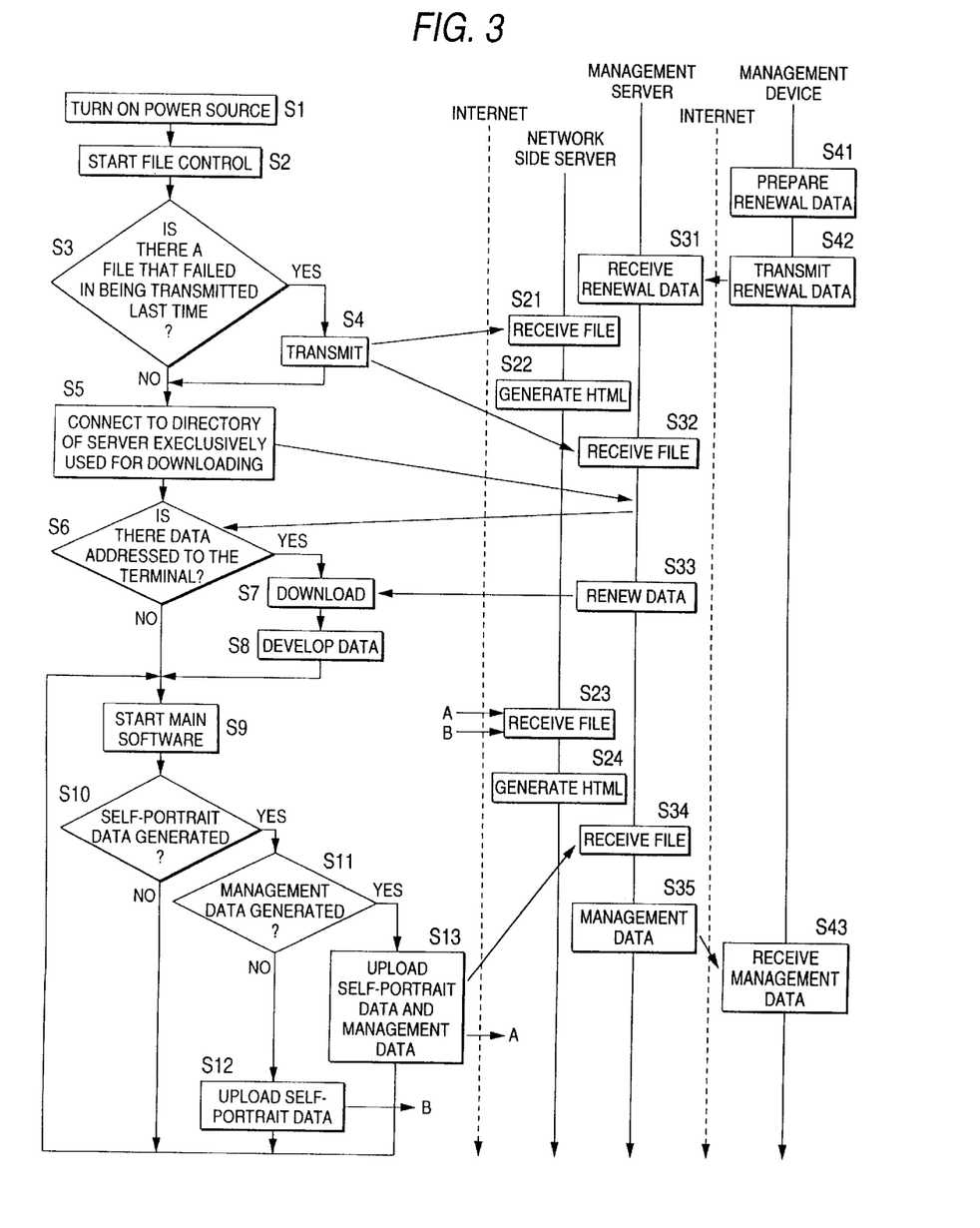
FIG. 3 is a flow chart showing an operation of the play device for generating a synthesized self-portrait.

Referring to a flow chart shown in FIG. 3, operation of the terminal 1 including rewriting the frame image data and commercial data will be explained after the electric power source has been turned on. After the electric power source is turned on (S1), the terminal 1 starts program (management of the file) (S2) at the same time. As explained previously, the terminal 1 is connected to the network server 5 via the Internet 6. When there is a non-transmitted file previously (YES in S3), the file is transmitted to the server 5 arranged in the network (S4, S21, S22, S32). After that, the terminal 1 is connected by the transmission program to the directory of the management server 9 which is exclusively used for downloading (S5). The index file of the directory is opened and it is checked whether to renew the data or not. It is also checked whether a frame image data or a program to be rewritten, and whether there is data addressed to the terminal 1 in the file (S6). When it is found that renewal data addressed to the terminal is in the file (S33), it is downloaded (S7). In this specification, the download permission function is defined as a function by which index file is opened. It is also checked whether or not renewal data addressed to the terminal is in the file, and the renewal data is then downloaded. Then, the downloaded data is automatically developed (S8). Thereafter, the terminal 1 automatically starts the main software in the network type play device (S8). After that, the network type play device is operated under a usual condition. Concerning the frame image data addressed to the terminal which has been downloaded and accommodated in the terminal, the CRT 14 is blinking for a predetermined period of time in order to let the player know that the frame image has been just replaced with a new one. After the self-portrait data has been generated by the customer (YES in S10), or after the commercial data has been generated, it is checked whether or not the management data is generated (S11). When the management data is not generated, the self-portrait data and the commercial data are uploaded to the network side server 5 (S12, S23, S24). When the management data is generated, the self-portrait data, commercial data and management data are uploaded to the network side server 5 (S13, S34, S35, S43).

Figure 4:
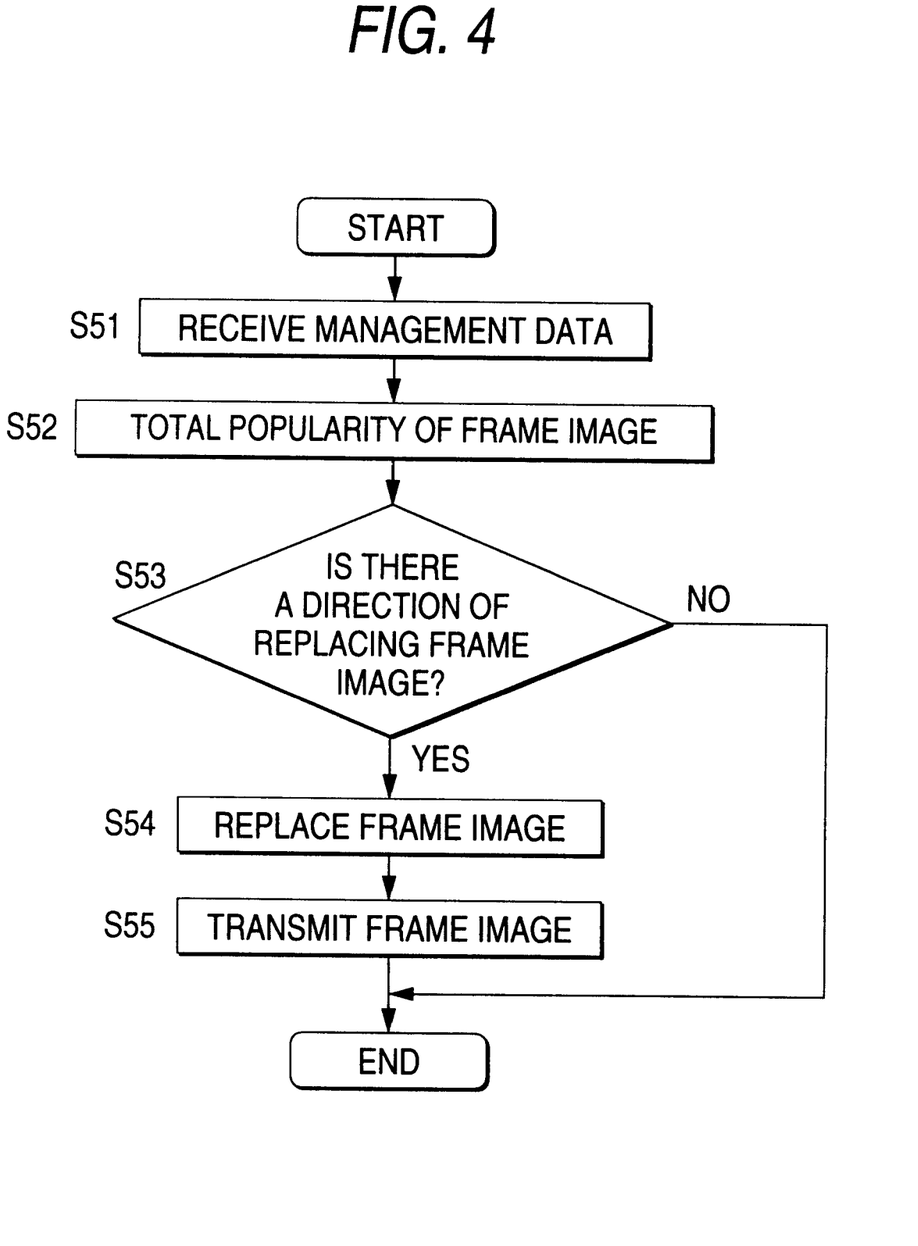
FIG. 4 is a flow chart showing an operation of a management device.

Next, referring to a flow chart shown in FIG. 4, operation of rewriting the frame image data and commercial data in the management device 8 will be explained. Concerning the commercial data, when the "frame image" is replaced with the "commercial data" in the flow chart shown in FIG. 4, operation is substantially the same. However, it is necessary to consider that a "total popularity of frame images (S53)" is the amount for charge of the commercial. This procedure corresponds to the processing of the preparation of renewal data shown in FIG. 3 (S41) and the transmission of renewal data (S42, S31). The management device 8 receives the management data (S51, S43). According to the management data, the popularity of the frame image is totaled (S52). Circumstances of the utilization of the frame image are analyzed, and the manager judges whether or not the frame is replaced with a new one. In the case of the commercial data, according to the change of the sponsor who pays the charge of the commercial, the manager judges whether or not the commercial data is replaced with a new one. Further, according to the amount of the commercial charge, the manager changes the frequency of displaying the commercial data on the image plane in the period of printing a seal. When the frame image is displayed on the CRT 14 so that the player can select the frame image, nine frame images f1, f2, f3 . . . f9 are displayed on one image plane. When the management device analyzes the management data, for example, it is possible to direct the renewal of one specific frame image in the nine frame images. It is thus possible to direct the rewriting of one specific frame image. When the replacement of the frame image or commercial data is directed (S53), the frame image for replacement or the commercial data for replacement is prepared. In this case, not all of the frame images are replaced. One or less than all of the frame images are replaced according to the management data as described above. Then, an index file is made so that a terminal ID for rewriting the frame image data or commercial data can be designated. A control program is made for transferring the frame image data or commercial data to the selected place in the terminal (S54). These data are transmitted to the selected position in the management server 9 (S55).

When one or less than all of the frame images are replaced, not according to the above management data, but according to the location of a terminal of the play device for generating a synthesized self-portrait, the frame image of a specific terminal may have a local favorite or seasonal favorite. For example, the frame image of a terminal 1 located in Kyoto may have images of old temples and shrines, while the one located in Okinawa may have images of sea and surf-riding. In this connection, the commercial data is replaced according to the change in the commercial sponsor. Further, when the commercial data is replaced, a location or desire of the sponsor is considered, so that a region in which the commercial data is displayed is restricted.

Alternatively, the following method may be adopted. At each terminal 1, the frequency of utilization of each frame image is totaled, so that the popularity of each frame image is found. When the electric power source of the terminal is turned on, the data of popularity of each frame image is transmitted to the server. When the server receives the above data, some frame images of low popularity are automatically replaced with other frame images which have been previously prepared. Similarly, the frequency of display of the commercial data at the terminal is inputted into the management computer 10 of the management device 8 by the manager according to the amount of the charge of the commercial. The thus inputted frequency is automatically stored in the hard disk 20a of the terminal 1 by the management server 9 or the work server 5. In accordance with the stored frequency, the commercial data is displayed at the terminal.

According to the above operation, when the electric power is supplied at random to each terminal of the network type play device installed in each place, the above operation is automatically conducted in each terminal when the business is not interfered with the above operation. Therefore, the frame image data, commercial data and program can be positively rewritten.

According to the above system, the following advantages can be provided. The terminal 1 brings the data by itself, so that it is unnecessary for the data supplying side to have a program for transmission in this system unlike the conventional polling system. Therefore, even if the number of terminals is increased, the data is transmitted in a short period of time. Further, the management device (center) side can be intact when the electric power source of each terminal is turned on. Furthermore, a telephone number of each terminal is not needed for the management device side. Even if the management device is accessed by a plurality of terminals, there are no problems in connection with the Internet. The terminals are thus located in shopping quarters and premises of railway stations. Therefore, operation time of each terminal is different. For the above reasons, the center side transmits the data to each terminal by the access from the center side.

Figure 5:
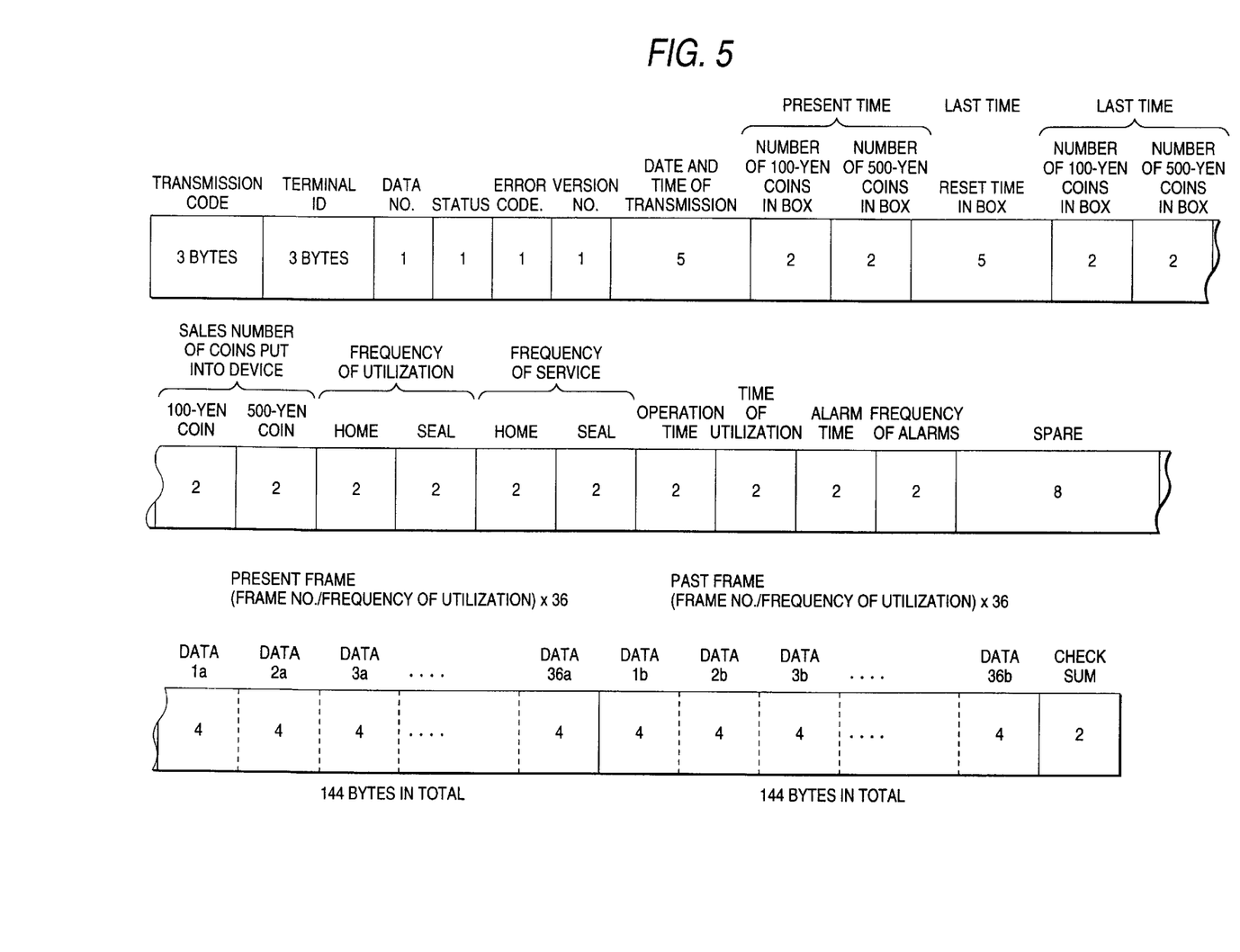
FIG. 5 is a format diagram of management data sent out from a terminal of the play device for generating a synthesized self-portrait.

FIG. 5 is a format diagram of management data sent out from the terminal 1 of the play device for generating a synthesized self-portrait. As described above, the terminal 1 is connected to the server 5 in the network via the communication line 2 and the Internet 6. Image data, voice data and character data (self-portrait data) are transmitted to the server 5, and further commercial data to which management data is added is transmitted to the server 5. Transmission is conducted when the network type play device is started and also when it conducts communication. In the server 5 arranged in the network, the management data is separated from the data that has been received. The management data is transferred to the management server 9 via the exclusive line 7. Further, the management data is transferred to the management computer 10 and the business data processing computer 11. In both computers 10 and 11, the received management data is successively renewed, and necessary processing is conducted according to the management data. The management data includes, for example, a frequency of operation for each type of play, the amount of sales, and the data of utilization of frame image data.

In an example shown in FIG. 5, terminologies are defined as follows. "Transmission code" is a code for generating the server realize that data is sent from the terminal 1. "Terminal ID" is a code number of the device in a plurality of play devices. "Data No." is a number for preventing data from skipping. "Status" is a transmission status. "Error code" is an error status. "Version number" is a program number. The present time numbers of 100-yen coins and 500-yen coins in the box are reset each time the coin box is opened. The last time numbers of 100-yen coins and 500-yen coins in the box are the integrated values. "Frequency of service" (both in home page and seal) is a frequency at which the play device is operated free of charge when the play device is out of order. "Alarm time" and "frequency of alarm" are data in case of using up sheets of paper. "Present frame" and "past frame" are data of individual utilization of the frame image data.

When the management data of this embodiment is used, a frequency of operation of the play device for each type of play, the amount of sales, and data of individual utilization of the frame image data and the commercial data are easily obtained on the management device 8 in a short period of time. Therefore, the business policy can be easily determined. When the terminal is connected to the Internet, the management data can be transmitted to the server together with the self-portrait data and commercial data. Therefore, it is unnecessary to transmit the management data additionally. Further, utilization of a plurality of frame images and commercial data are quickly obtained. Accordingly, it is possible to find out the taste of customers, so that the obtained taste of customers can be used when the version of the frame image data is changed for improvement. In this way, the quality of play can be enhanced.

In order to smoothly replace the frame image data and commercial data, individual utilization data of the frame image data or commercial data in the management data explained with reference to FIG. 5 contains information to specify the frame image data or commercial data at each terminal 1. Consequently, each terminal 1 includes: transmitting means for transmitting the above management data; and generating and transmitting means for generating information to specify the individual frame image data or commercial data at each terminal and for transmitting it together with the management data.

Figure 6:
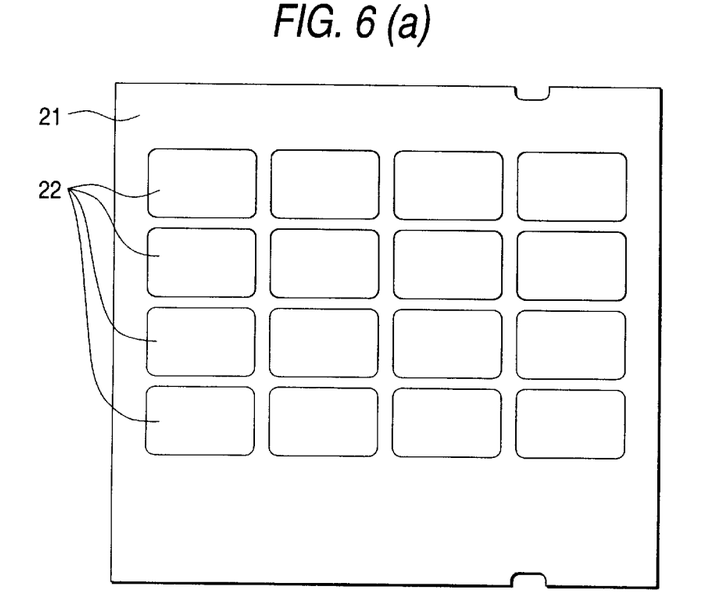
FIG. 6A illustrates a printed seal in a stand-alone type play device.
FIG. 6B illustrates a printed seal in a network type play device.

FIGS. 6A and 6B illustrate examples of a printed seal in the stand-alone type play and a printed seal in the network type play, respectively. A sheet of paper used for the seal 21 in the seal printing play is the same as for the seal in the printing for a home page. As explained earlier, a maintenance such as supplying sheets of paper can be easily performed. The number of pieces of the seal 22 for the home page printing is smaller than that of the seal 22 of the former printing. A message 23 inputted by the player, the address of the home page, ID number, password 24 and comment 25 can be recorded in the margin formed in the above manner.

The present invention is not limited to the above specific embodiment, but various variations can be made. For example, the terminal 1 of this embodiment includes a play function in which a self-portrait is printed on a seal so that the seal can be provided to the player. Also, a play function in which a home page containing the self-portrait data is registered and is printed on a seal (network type play device), while the commercial data is displayed on the information display means. The play device is not limited to the above embodiment, but it may have only the network type play function. As long as the terminal 1 of this embodiment is operated in such a manner that it arbitrarily accesses the server, and the frame data or commercial data stored in the server are obtained in remote control by the terminal via the communication network. Thus, any types of terminal can be adopted. The communication network may be through either limited to the Internet or an exclusive line.

As described above, one or a plurality of commercial data used for advertisement can be easily replaced with another commercial data via the communication line at each terminal. Accordingly, each time the sponsor of a commercial is changed, the commercial data can be replaced with a new one. Therefore, advertising efficiency is increased and the sponsor makes profit. Even if a large number of terminals are dispersed to every place in the whole country, the commercial data of each terminal can be effectively rewritten in a remote control at low cost. Further, when the electric power source of play device is turned on, the commercial data is automatically downloaded, so that it is not necessary to stop operating the play device for downloading the commercial data. Accordingly, the rate of operation of the play device is not affected.

In addition, rewriting of one or a plurality of commercial data can be conducted individually by the server at each terminal. Thus, the amount of charge of the commercial can be changed, and the setting of frequency of utilization of the commercial data at each terminal is changed in accordance with desire of the sponsor. Further, the setting of utilization of the commercial data can be varied in an appropriate time according to the region where the terminal is located.

While the present invention has been described in detail and with reference to specific embodiments thereof, it will be apparent to those skilled in the art that various modifications and variations can be made in the terminal and server of play device for generating a synthesized self-portrait of the present invention without departing from the spirit or scope of the inventions. Thus, it is intended that the present invention cover the modifications and variations of this invention provided they come within the scope of the appended claims and their equivalents.

What is claimed is:

1. A play device for generating a synthesized self-portrait having a photographed image of a player and a frame image, the device comprising:

a plurality of terminals for displaying and printing the synthesized self-portrait;

a network server for providing commercial data to be shown on the terminals while the player waits for printing of the synthesized self-portrait, the commercial data being renewed in the terminals without interfering with generation of the synthesized self-portrait;

a management device for managing the play device and receiving management data from the terminals; and a monitoring system for monitoring various operating conditions of the play device.

2. The device according to claim 1, wherein the terminal has a data storage accommodating at least one commercial data.

3. The play device according to claim 1, wherein each terminal comprises, a communication network access allowing access to a server storing and providing a commercial data with the terminal, a downloader for downloading the commercial data from the server to an addressed terminal, the commercial data being rewritable in the terminal, and a data storage device accommodating the commercial data, wherein the commercial data is displayed on the display device or a voice is played by a sound system simultaneously when the self-portrait is printed on a sheet.

4. The play device according to claim 3, wherein the downloader automatically downloads commercial data to the addressed terminal when an electric power source of the terminals is turned on.

5. The play device according to claim 1, wherein the network server comprises, a rewriting commercial data setting unit for setting at least one rewriting commercial data when a plurality of terminals of play devices for generating synthesized self-portraits are individually designated; and a download permission unit for permitting each terminal to download the rewriting commercial data when each terminal accesses the download permission unit through a communication network.

6. The server of a play device for generating a synthesized self-portrait according to claim 5, wherein a number of the commercial data to be shown at each terminal set for rewriting in the rewriting commercial data setting unit corresponds to an amount of charge for a commercial.

7. The server of a play device for generating a synthesized self-portrait according to claim 5, wherein the commercial data is set in the rewriting commercial data setting unit to be played only at a restricted terminal of the play device in accordance with a desire of a commercial sponsor.

8. The play device according to claim 1, wherein the management device is connected to the network server through a first exclusive line.

9. The play device according to claim 1, wherein the monitoring system is connected to the management device through a second exclusive line.

10. The play device according to claim 1, wherein the network server is connected to the terminals through Internet.

11. The play device according to claim 1, wherein the management data include a frequency of operation for each type of play, an amount of sale, and data for the frame image.

* * * * *